(12) United States Patent
Dunham et al.

(10) Patent No.: US 7,864,539 B2
(45) Date of Patent: Jan. 4, 2011

(54) HORIZONTAL DRIVE DRAWER SYSTEM AND METHOD

(75) Inventors: John Dunham, Kechi, KS (US); Ryan Signer, Derby, KS (US); Robert T Harvey, Wichita, KS (US); Benny Lima, Snellville, GA (US)

(73) Assignee: LSI Corporation, Milpitas, CA (US)

( * ) Notice: Subject to any disclaimer, the term of this patent is extended or adjusted under 35 U.S.C. 154(b) by 76 days.

(21) Appl. No.: 12/082,481

(22) Filed: Apr. 11, 2008

(65) Prior Publication Data

US 2009/0257186 A1 Oct. 15, 2009

(51) Int. Cl.
*H05K 7/18* (2006.01)
(52) U.S. Cl. .................. 361/727; 361/724; 361/679.33; 361/679.02; 312/223.1; 312/223.2
(58) Field of Classification Search ............ 361/679.02, 361/679.33–679.39, 724–727; 312/223.1–223.2
See application file for complete search history.

(56) References Cited

U.S. PATENT DOCUMENTS

| | | | | |
|---|---|---|---|---|
| 5,340,340 | A * | 8/1994 | Hastings et al. ............... | 439/64 |
| 5,506,750 | A * | 4/1996 | Carteau et al. ......... | 361/679.32 |
| 5,721,669 | A * | 2/1998 | Becker et al. .......... | 361/679.31 |
| 6,754,082 | B1 * | 6/2004 | Ding et al. ................... | 361/727 |
| 6,856,508 | B2 * | 2/2005 | Rabinovitz ............. | 361/679.31 |
| 6,999,306 | B2 * | 2/2006 | Walczak et al. ......... | 361/679.37 |
| 7,116,241 | B2 * | 10/2006 | Post et al. ................. | 340/693.5 |
| 7,245,499 | B2 * | 7/2007 | Stahl et al. ................... | 361/754 |
| 2009/0135558 | A1 * | 5/2009 | Hughes ................. | 361/679.46 |
| 2009/0179535 | A1 * | 7/2009 | Boger ...................... | 312/223.2 |

\* cited by examiner

*Primary Examiner*—Jayprakash N Gandhi
*Assistant Examiner*—Ingrid Wright
(74) *Attorney, Agent, or Firm*—Suiter Swantz pc llo

(57) ABSTRACT

An apparatus may include drive chassis, at least one horizontal drive drawer extending from a first side of the drive chassis to a second side of the drive chassis and/or at Least one computer drive disposed on the horizontal drive drawer. Additionally, a computer server system and a method for providing the apparatus are disclosed.

13 Claims, 9 Drawing Sheets

HORIZONTAL DRIVE DRAWER SYSTEM AND METHOD

TECHNICAL FIELD

The present disclosure generally relates to the field of computer systems and configurations, and more particularly to a computer drive system for data storage systems.

BACKGROUND

Many computer storage enclosures, such as a server, utilize multiple drives and removable components. A computer server may include a housing for a number of drives and/or other individual minimally-packaged computer components. A drive and/or computer component may include one or more processors, memory, storage, and/or network connections, but may share a common power supply and common air-cooling resource of the chassis. A server may have certain components removed for space and power consideration while still being functional as a computer. A computer server may allow more processing power in less rack space, simplified cabling, and reduced power consumption.

SUMMARY

An apparatus may include drive chassis, at least one horizontal drive drawer extending from a first side of the drive chassis to a second side of the drive chassis and/or at least one computer drive disposed on the horizontal drive drawer.

A computer server system may include computer server chassis defining an enclosure, a mid-plane disposed in the computer server chassis, at least one drive chassis, at least one horizontal drive drawer extending from a first side of the drive chassis to a second side of the drive chassis, and/or at least one computer drive disposed on the horizontal drive drawer supported by the drive chassis.

A method may include arranging at least one computer drive on a horizontal drive drawer and/or positioning at least one horizontal drive drawer in a computer server chassis.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
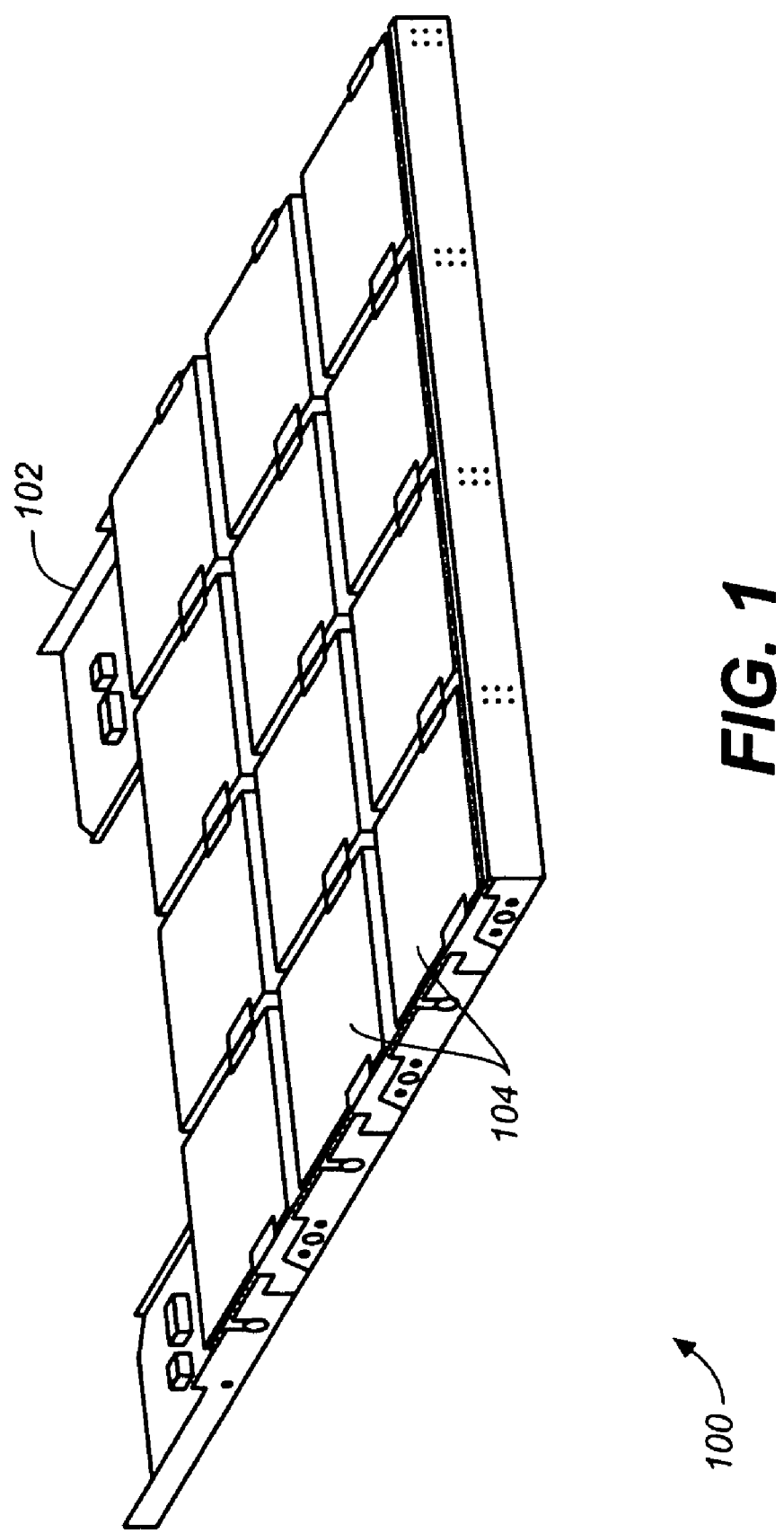
FIG. 1 is an isometric view illustrating a computer drive apparatus.
Figure 2:
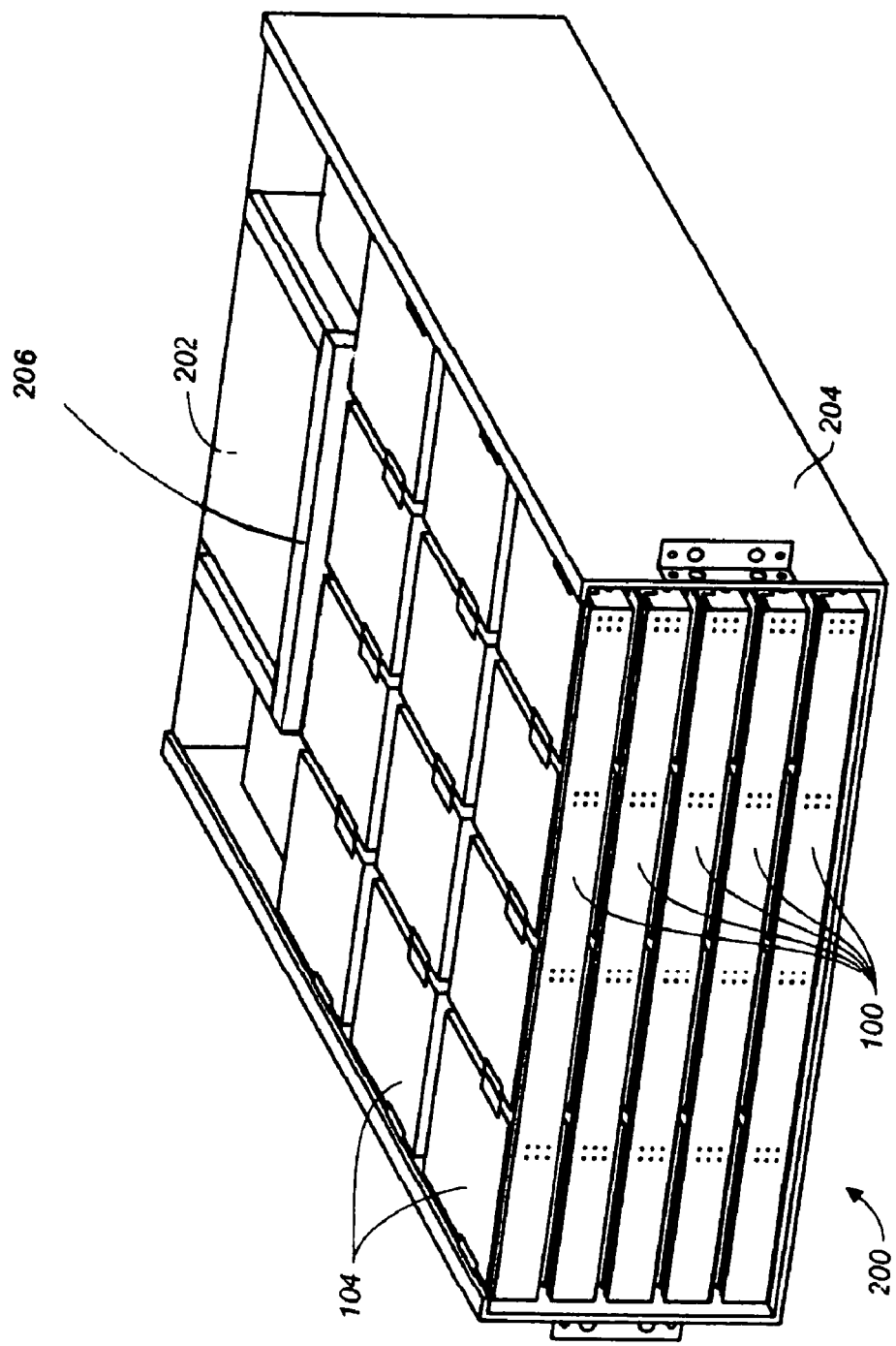
FIG. 2 is an isometric view illustrating a computer server system.

Reference will now be made in detail to the subject matter disclosed, which is illustrated in the accompanying drawings.

Referring generally to FIGS. 1 through 5, a horizontal drive drawer 100, a computer server system 200 utilizing a horizontal drive drawer 100, and a method for providing a horizontal drive drawer 100 are described. The horizontal drive drawer 100 may include at least one computer drive 104 disposed on a drive chassis 102. The computer server system 200 may include a chassis 204, at least one horizontal drive drawer 100, and a midplane 206.

A horizontal drive drawer 100 may include a drive chassis 102 and/or at least one computer drive 104. A drive chassis 102 may include a frame designed to hold a hardware device and/or structure to support computer drives disposed on the drive chassis 102. A frame and/or structure may include any architectural element and/or system for mounting and/or supporting at least one computer drive 104 familiar to those skilled in the art. For example, a frame and/or structure may include server rack rail and mounting strips. A frame and/or structure may include steel and/or aluminum. In one example, a rack may include a system for mounting at least one computer drive 104 and/or other electronic device. In another example, a drive chassis 102 includes a pair of rails mounted directly on the rack and the drive chassis 102 slides into the rack along the rails. The rails may be able to fully support the drive chassis 102 when it has been positioned clear of the rack or when the rack has been fully withdrawn from a chassis 204. The vertical usable space and/or height of a rack and/or drawer may be measured in rack units (1U) where 1U is equal to approximately 1.75 inches. A rack unit may include a unit of measure for quantifying the height of a server or other similar device mounted in a rack. In one example, a horizontal drive drawer 100 may include a horizontal drawer having 7 inches of usable vertical space (4U=4×1.75 in.=7 in.). Each drawer in the system may be less than 1U in height and/or may be greater than 1U in height. In another example, a 4U data storage system may include five horizontal drawers each having twelve drives where each drawer has a height less than 1U. In yet another example, a horizontal drive drawer 100 may include twelve 3½ inch drives. In still another example, a horizontal drive drawer 100 may include twenty four 2½ inch drives. A computer drive may include a hard disk. In one instance, a horizontal drive drawer 100 includes a drive chassis 102 having twelve computer drives 104. Further, the horizontal drive drawer 100 may include at least one controller 202 meeting Storage Bridge Bay working group (SBB) standards and/or may include at least one hot-swappable computer drive 104. An SBB-compliant controller may include a controller 202 meeting certain requirements including size and/or specification for fitting and operating within an SBB-compliant storage array and/or computer system. Other controllers may be used, including any device utilized for controlling the transfer of data from a computer to a peripheral device and/or from a peripheral device to a computer. Some examples of controllers may include a disk controller, a SCSI controller, a graphics controller, a network controller, and/or other types of controllers. A hot-swappable computer drive 104 may include a drive capable of being removed and/or replaced while the computer processor is operating.

A computer server system 200 may include a chassis 204, at least one horizontal drive drawer 100, and a midplane 206. A chassis 204 may include an enclosure configured for containing at least one rack and/or horizontal drive drawer 100. A chassis 204 may include a rack mounted system, a rack mount chassis, and/or any other enclosure adapted to contain and/or support computer and/or electronic equipment. Further, the computer server system 200 may include a midplane 206. A midplane 206 may include bus circuitry, circuitry connections, and may be positioned between a front and a back of a chassis 204 and/or between at least one drive drawer and a SBB controller. Additionally, a computer server system 200 may include a backplane. A backplane may include similar bus circuitry and circuitry connections as a midplane 206. One example of a computer server system 200 utilizing at least one horizontal drive drawer 100 may include a blade sever system. A blade server system may include a high-density self-contained computer server. Components in a blade server may be removed for power, space, and/or other considerations while including all the functional components of a computer.

Figure 3:
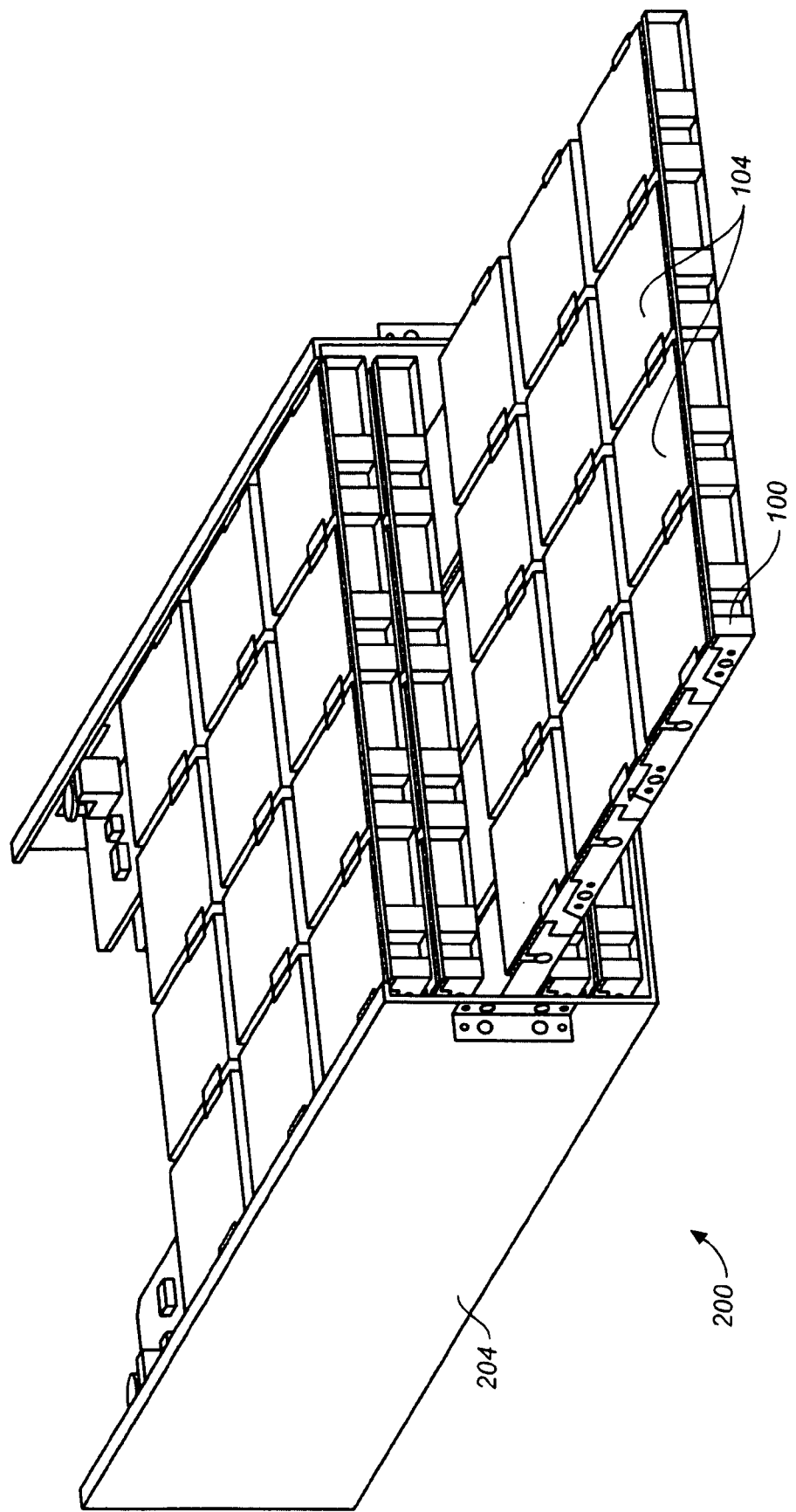
FIG. 3 is an isometric view of the computer system in FIG. 2, illustrating an extended computer drive apparatus.
Figure 4:
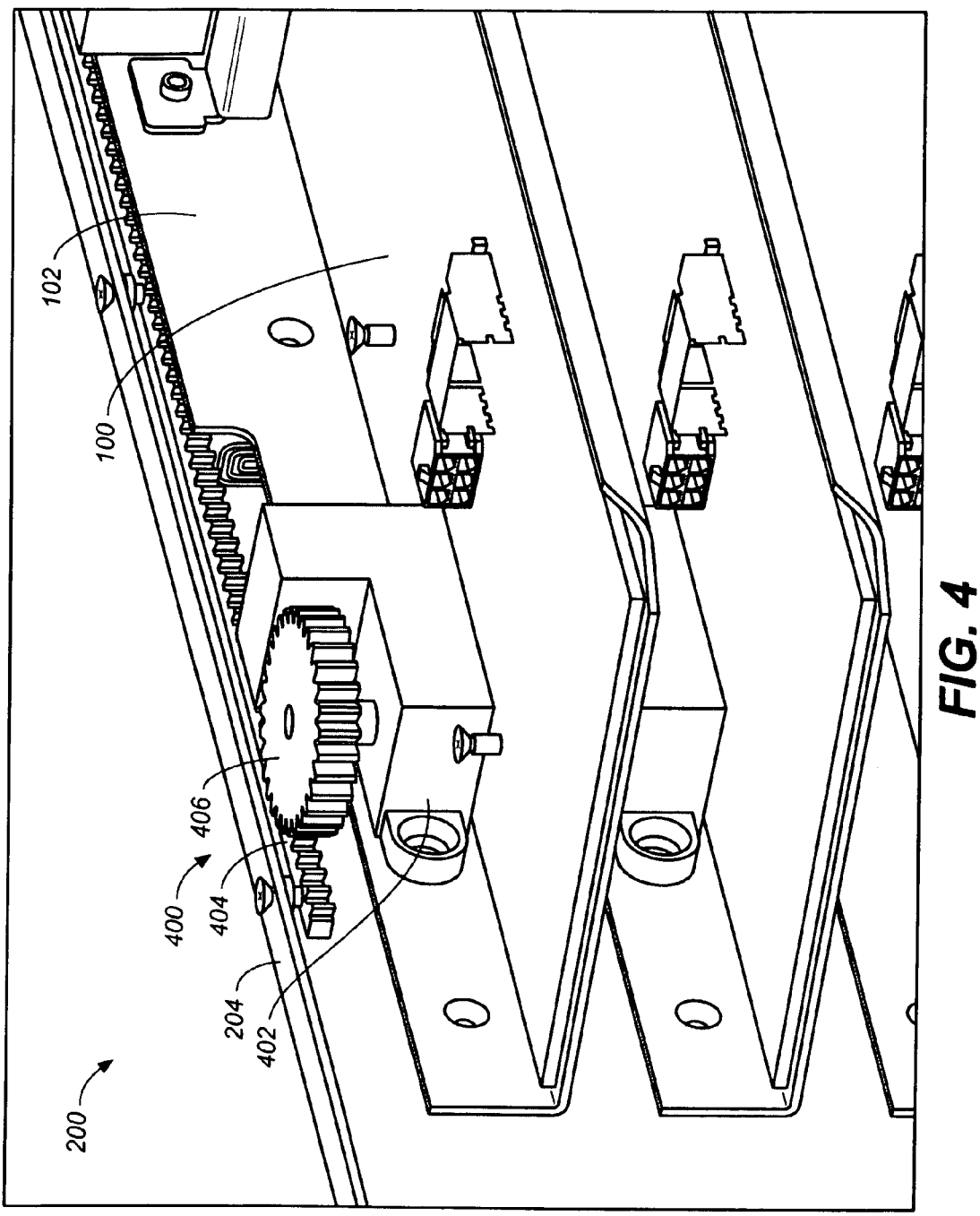
FIG. 4 is a partial isometric view illustrating a motor assembly.
Figure 5:
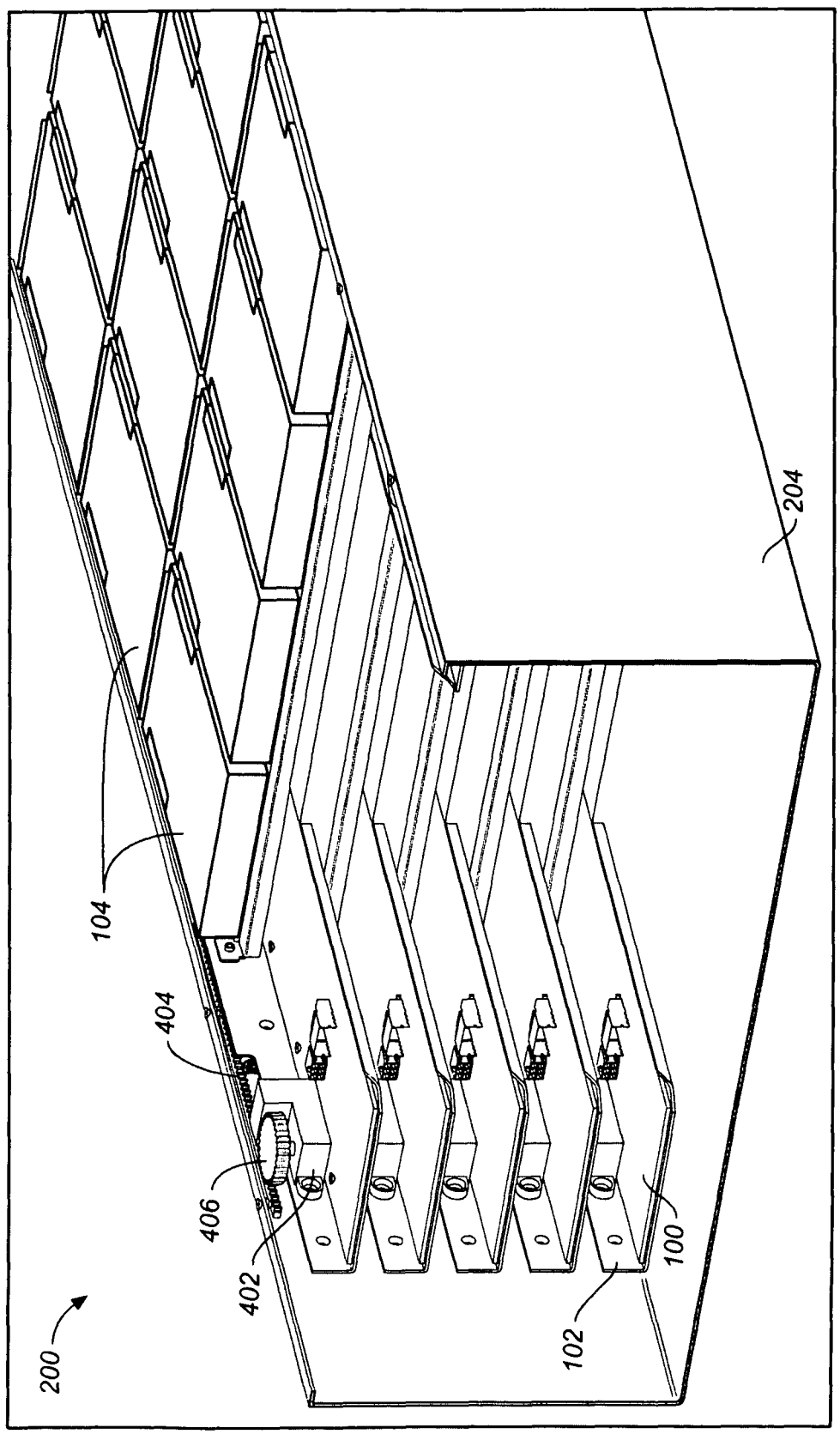
FIG. 5 is a partial isometric view of a motor assembly coupled with a computer drive apparatus disposed in a computer server system.

Additionally, a computer server system 200 may include a horizontal drawer motor assembly 400. The horizontal drawer motor assembly 400 may include a motor 402, a gear rack 404, and/or a motor gear 406. The motor 402 may include any suitable motor configured to reposition a horizontal drive drawer 100. For example, a brushless DC motor 402 may be disposed on a surface of the drive chassis 102. The motor 402 may include a motor gear 406 adapted to rotate against a gear rack 404. The motor gear 406 may include a component having linkages and/or teeth for transmitting rotational force to another device, such as a gear rack 404. The gear rack 404 may include a toothed rack secured to a surface of a chassis 204 and may mesh with linkages and/or teeth disposed on the motor gear 406. As illustrated in FIG. 3, a horizontal drawer motor assembly 400 may be repositioned to an extended position and/or a contracted position by the horizontal drawer motor assembly 400. The motor 402 may rotate the motor gear 406, which may be adapted to rotate against a gear rack 404 and in turn transfer a force to and/or from horizontal drive drawer 100 for repositioning the horizontal drive drawer 100.

Figure 6:
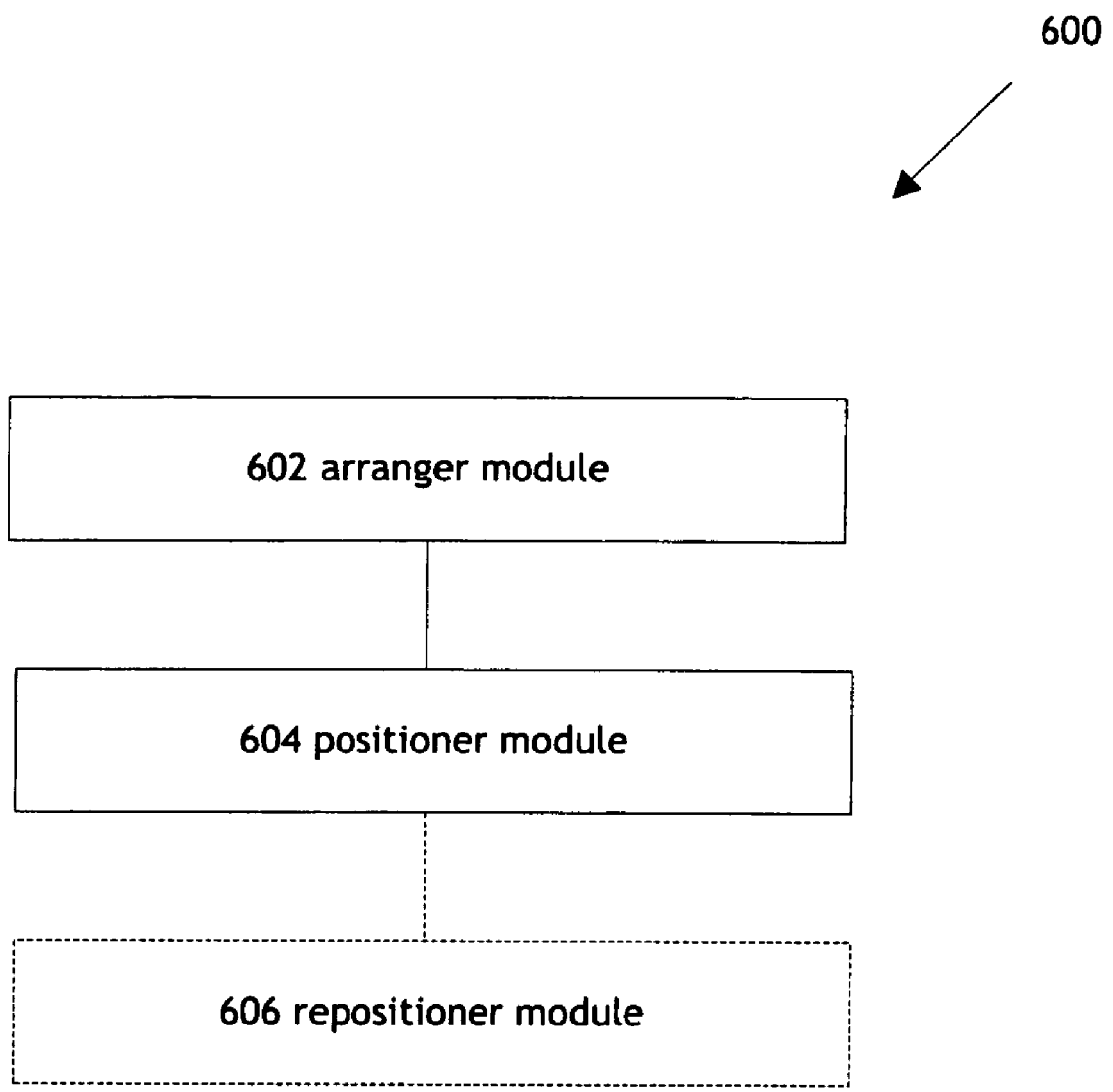
FIG. 6 illustrates an exemplary environment in which one or more technologies may be implemented.

Referring to FIG. 6, a system 600 for arranging at least one computer drive on a horizontal drive drawer and/or positioning at least one horizontal drive drawer in a computer server chassis is illustrated. The system 600 may include arranger module 602, positioner module 604, and/or repositioner module 606. System 600 generally represents instrumentality for arranging at least one computer drive on a horizontal drive drawer and/or positioning at least one horizontal drive drawer in a computer server chassis. The steps of arranging at least one computer drive on a horizontal drive drawer and/or positioning at least one horizontal drive drawer in a computer server chassis may be accomplished electronically (e.g. with a set of interconnected electrical components, an integrated circuit, and/or a computer processor, etc.) and/or mechanically (e.g. an assembly line, a robotic arm, etc.).

Figure 7:
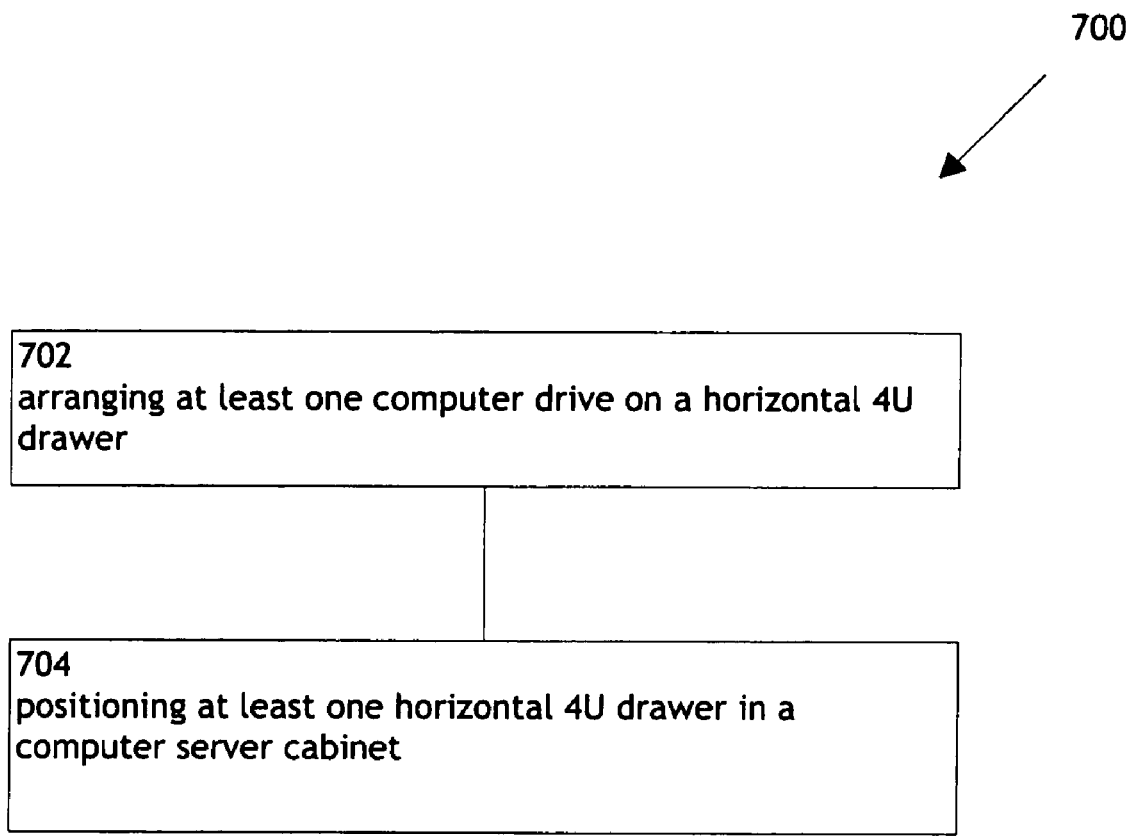
FIG. 7 illustrates an operational flow representing example operations related to providing a horizontal drive drawer and/or a server system utilizing a horizontal drive drawer.
Figure 8:
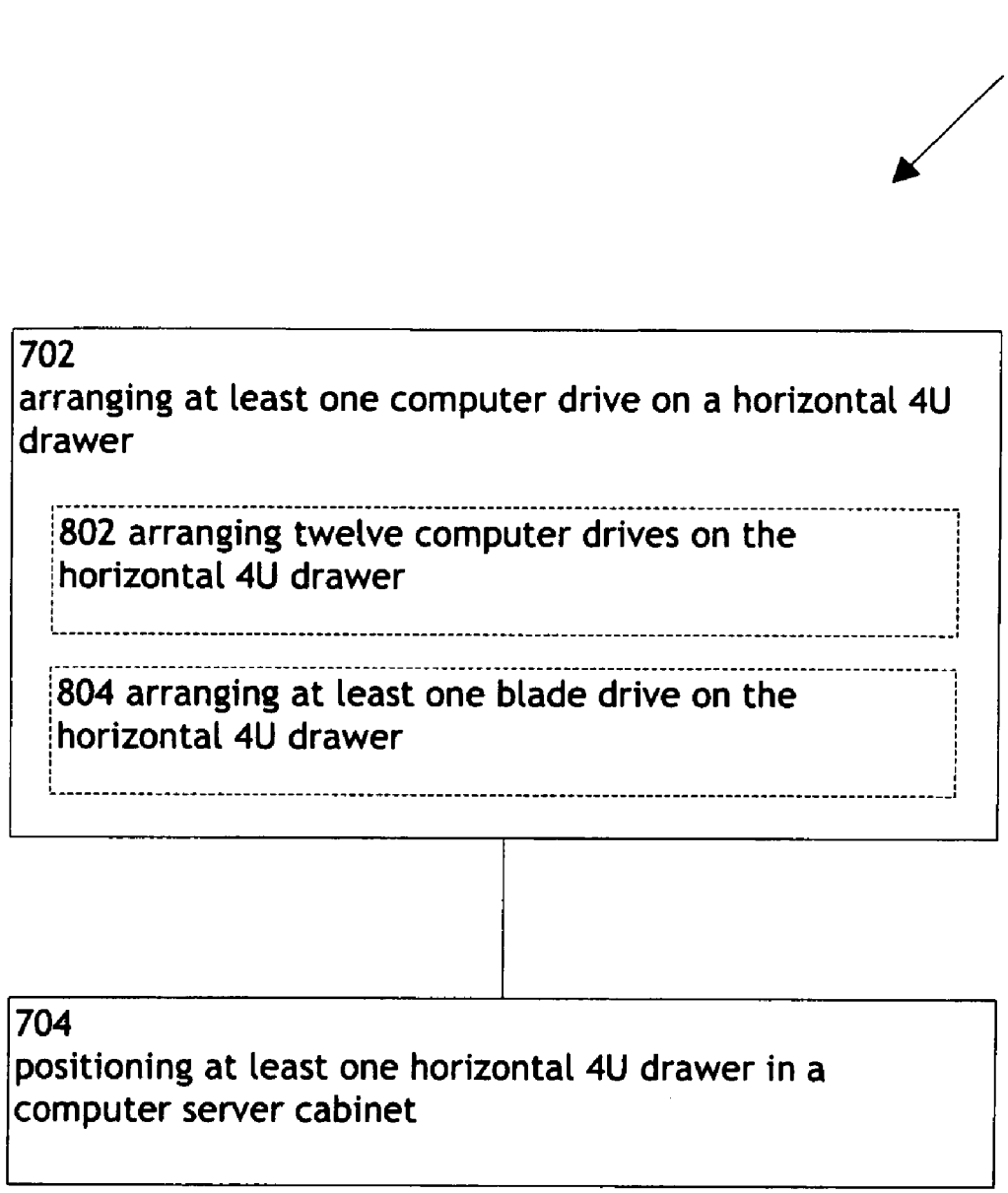
FIG. 8 illustrates an alternative embodiment of the operational flow of FIG. 7.
Figure 9:
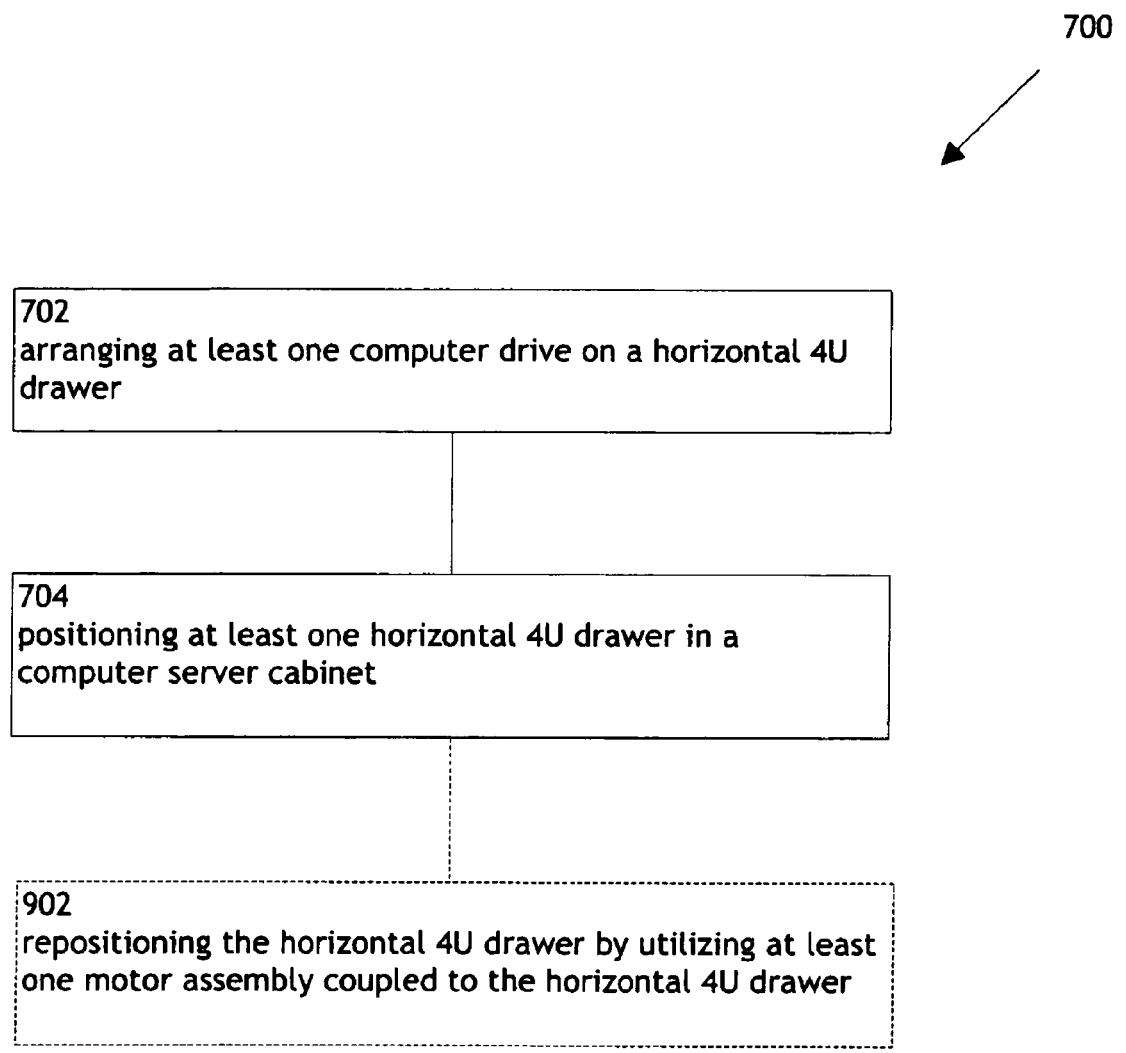
FIG. 9 illustrates an alternative embodiment of the operational flow of FIG. 7.

Referring generally to FIGS. 7 through 9, methods for providing a horizontal drive drawer 100 and/or a computer server system 200 utilizing a horizontal drive drawer 100 are disclosed. FIG. 7 illustrates an operational flow 700 representing example operations related to arranging at least one computer drive on a horizontal drive drawer and/or positioning at least one horizontal drive drawer in a computer server chassis are disclosed. In FIG. 7 and in following figures that include various examples of operational flows, discussion and explanation may be provided with respect to the above-described examples of FIGS. 1 through 6, and/or with respect to other examples and contexts. However, it should be understood that the operational flows may be executed in a number of other environments and contexts, and/or in modified versions of FIGS. 1 through 9. Also, although the various operational flows are presented in the sequence(s) illustrated, it should be understood that the various operations may be performed in other orders than those which are illustrated, or may be performed concurrently.

After a start operation, the operational flow 700 moves to an arranging operation 702, where arranging at least one computer drive on a horizontal drive drawer may occur. For example, as generally shown in FIGS. 1 through 5, horizontal drive drawer 100 may be arranged with at least one computer drive 104. Arranging operation 702 may be conducted in an automated fashion such as, for example, by an automated arranger module 602 (e.g. a robotic arm and/or automated production line configured to arrange the at least one computer drive 104 on a horizontal drive drawer 100), such as those commonly found in the manufacturing arts.

Then, in a positioning operation 704, positioning at least one horizontal drive drawer in a computer server chassis may occur. For example, as shown in FIGS. 1 through 5, horizontal drive drawer 100 may be positioned in a computer server chassis 204. Arranging operation 704 may be conducted in an automated fashion such as, for example, by an automated positioner module 604 (e.g. a robotic arm and/or automated production line configured to position horizontal drive drawer 100 in a computer server chassis 204) such as those commonly found in the manufacturing arts.

FIG. 8 illustrates alternative embodiments of the example operational flow 700 of FIG. 7. FIG. 8 illustrates example embodiments where the arranging operation 702 may include at least one additional operation. Additional operations may include an operation 802 and or operation 804.

At operation 802, arranging at least twelve computer drives on the horizontal drive drawer may occur. For example, arranger module 602 may arrange twelve computer drives on horizontal drive drawer 100. In one instance, arranger module 602 includes a robot arm and/or automated production line configured to arrange twelve computer drives on horizontal drive drawer 100. At operation 804, arranging at least one blade drive on the horizontal drive drawer may occur. For example, arranger module 602 may arrange at least one computer drive on horizontal drive drawer 100. In one instance, arranger module 602 includes a robot arm and/or automated production line configured for arranging at least one blade drive on horizontal drive drawer 100.

FIG. 9 illustrates alternative embodiments of the example operational flow 700 of FIG. 7. FIG. 9 illustrates example embodiments where the operational flow 700 may include at least one additional operation. Additional operations may include operation 902.

At operation 902, repositioning the horizontal drive drawer by utilizing at least one motor assembly coupled to the horizontal drive drawer may occur. For example, the repositioner module 606 may reposition horizontal drive drawer 100 by utilizing at least one motor assembly coupled to horizontal drive drawer 100. In one instance, repositioner module 606 includes a robot arm, at least one motor assembly, and/or automated production line configured to reposition horizontal drive drawer 100.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An apparatus, comprising:
   a drive chassis, said drive chassis including a gear rack;
   at least one horizontal drive drawer extending from a first side of the drive chassis to a second side of the drive chassis, each of said at least one horizontal drive drawer including a height less than 1U rack unit;
   a motor assembly, said motor assembly including a motor and motor gear, said motor and motor gear being disposed on said at least one horizontal drive drawer; and
   an array of computer drives disposed on the at least one horizontal drive drawer supported by the drive chassis, the array of computer drives disposed horizontally on the at least one horizontal drive drawer, wherein said motor gear is adapted to rotate against said gear rack on said drive chassis upon rotary motion of the motor to cause movement of the at least one horizontal drive drawer.

2. The apparatus in claim 1, wherein the drive chassis comprises:
   at least one controller meeting a Storage Bridge Bay Working Group (SBB) standard.

3. The apparatus in claim 1, wherein the at least one horizontal drive drawer extending from a first side of the drive chassis to a second side of the drive chassis comprises:
   a horizontal drawer including a blade server.

4. The apparatus in claim 1, wherein the array of computer drives disposed on the at least one horizontal drive drawer comprises:
   at least twelve drives disposed on the at least one horizontal drive drawer.

5. The apparatus in claim 1, wherein the at least one computer drive disposed on the at least one horizontal drive drawer comprises:
   a hot-swappable computer drive.

6. A computer server system, comprising:
   a computer server chassis defining an enclosure;
   at least one controller meeting a Storage Bridge Bay Working Group (SBB) standard;
   a midplane disposed in the computer server chassis;
   at least one drive chassis, said drive chassis including a gear rack;
   at least one horizontal drive drawer extending from a first side of the drive chassis to a second side of the drive chassis, each of said at least one horizontal drive drawer including a height less than 1U rack unit;
   a motor assembly, said motor assembly including a motor and motor gear, said motor and motor gear being disposed on said at least one horizontal drive drawer; and
   an array of computer drives disposed on the horizontal drive drawer supported by the drive chassis, the midplane coupled to the at least one controller and said array of drives, wherein said motor gear is adapted to rotate against said gear rack on said drive chassis upon rotary motion of the motor to cause movement of the at least one horizontal drive drawer, each drive of the array of computer drives disposed on the at least one horizontal drive drawer includes a hot-swappable computer drive.

7. The computer server system in claim 6, wherein the computer server chassis defining an enclosure comprises:
   a one meter computer server chassis.

8. The computer server system in claim 6, wherein the computer server chassis defining an enclosure comprises:
   a computer server chassis configured for enclosing a blade server system.

9. The computer server system in claim 6, wherein the computer server chassis defining an enclosure comprises:
   at least five horizontal drive drawers.

10. The computer server system in claim 6, wherein the at least one horizontal drive drawer extending from a first side of the drive chassis to a second side of the drive chassis comprises:
    a horizontal drawer including a blade server.

11. The computer server system in claim 6, wherein the array of computer drives disposed on the at least one horizontal drive drawer comprises:
    at least twelve drives disposed on the at least one horizontal drive drawer.

12. The computer system server in claim 6, wherein said array of computer drives includes at least twelve 3½ inch drives.

13. The computer system server in claim 6, wherein said array of computer drives includes at least twenty-four 2½ inch drives.

* * * * *